(12) United States Patent
Fujita (10) Patent No.: US 7,132,156 B2
(45) Date of Patent: Nov. 7, 2006

(54) PREFORM FOR COMPOSITE MATERIAL AND ALUMINUM COMPOSITE MATERIAL HAVING THE PREFORM FOR COMPOSITE MATERIAL AND A MANUFACTURING METHOD OF THE SAME

(75) Inventor: Makoto Fujita, Anjo (JP)

(73) Assignee: Central Motor Wheel Co., Ltd., Anjo (JP)

( * ) Notice: Subject to any disclaimer, the term of this patent is extended or adjusted under 35 U.S.C. 154(b) by 0 days.

(21) Appl. No.: 11/118,597

(22) Filed: Apr. 28, 2005

(65) Prior Publication Data

US 2005/0183839 A1 Aug. 25, 2005

(30) Foreign Application Priority Data

Feb. 28, 2003 (JP) .............................. 2003-052341

(51) Int. Cl.
- *B32B 5/08* (2006.01)
- *B32B 5/18* (2006.01)
- *B32B 3/10* (2006.01)
- *B32B 18/00* (2006.01)

(52) U.S. Cl. .............................. 428/320.2; 428/311.51; 428/312.2; 428/338; 428/469; 428/539.5

(58) Field of Classification Search .................... None
See application file for complete search history.

(56) References Cited

U.S. PATENT DOCUMENTS

| | | | |
|---|---|---|---|
| 5,369,064 A * | 11/1994 | Ohashi et al. ............. | 501/95.1 |
| 5,407,754 A * | 4/1995 | Harada et al. ............. | 428/614 |
| 5,563,199 A * | 10/1996 | Harada et al. ............. | 524/413 |
| 5,942,205 A * | 8/1999 | Murata et al. ............. | 423/598 |
| 6,083,083 A * | 7/2000 | Nishimura .................... | 451/41 |
| 6,165,605 A * | 12/2000 | Fujita et al. ............. | 428/312.8 |
| 6,291,057 B1 * | 9/2001 | Fujita ....................... | 428/293.4 |
| 6,309,743 B1 * | 10/2001 | Fujita ....................... | 428/317.9 |
| 6,571,858 B1 * | 6/2003 | Fujita .......................... | 164/98 |

OTHER PUBLICATIONS

JP 09-316566 English Machine Translation, Sep. 1997.*
Patent Abstracts of Japan for J09-316566 published Dec. 9, 1997.

* cited by examiner

*Primary Examiner*—Jennifer C. McNeil
*Assistant Examiner*—Jason L. Savage
(74) *Attorney, Agent, or Firm*—Darby & Darby (57) ABSTRACT

A preform for the composite material and an aluminum composite material which can form a composite material has excellent abrasion resistant property and high strength and a manufacturing method of the same are disclosed. A premixture 9 comprising aluminum borate whisker 3 and potassium titanate whisker 4 in the range of 5% to 20% by volume was sintered at certain temperature. The titanium oxide 11 produced by the whisker reaction was bound to the surface of aluminum borate whisker 3, and the preform having high strength was obtained accordingly. Aluminum composite material 10 having excellent abrasion resistant property and high strength was obtained by impregnating aluminum alloy 6 to preform 1 for composite material.

9 Claims, 10 Drawing Sheets

| Preform for the composite material | Compressive strength (MPa) |
|---|---|
| Preform A for the composite material (Embodiment 1) | 7.5 |
| Preform B for the composite material (Embodiment 2) | 3.8 |
| Preform C for the composite material (Comparison embodiment 1) | 2.0 |
| Preform D for the composite material (Comparison embodiment 2) | 1.3 |
| Preform E for the composite material (Comparison embodiment 3) | 2.0 |

Fig. 9

| Aluminum composite material | Tensile strength (MPa) | Abrasion resistant property (x $10^{-3}$ mm$^3$) | Hardness (Hv) |
|---|---|---|---|
| Aluminum composite material A (Embodiment 1) | 330 | 1 | 140 |
| Aluminum composite material B (Embodiment 2) | 287 | Almost no abrasion | 130 |
| Aluminum composite material C (Comparison embodiment 1) | 300 | 4 | 113 |
| Aluminum composite material D (Comparison embodiment 2) | 280 | 5 | 128 |
| Aluminum composite material E (Comparison embodiment 3) | 260 | 120 | 120 |
| Aluminum alloy base material F (Comparison embodiment 4) | 230 | 350 | 98 |

PREFORM FOR COMPOSITE MATERIAL AND ALUMINUM COMPOSITE MATERIAL HAVING THE PREFORM FOR COMPOSITE MATERIAL AND A MANUFACTURING METHOD OF THE SAME

BACKGROUND OF THE INVENTION (1) Filed of the Invention

The present invention relates to a preform for a composite material forming a composite material by compounding a light metal such as an aluminum alloy, an aluminum composite material formed by impregnating a hot solution of an aluminum alloy to the preform for the composite material, and a manufacturing the same.

(2) Description of the Background Art

A part made of a light metal such as aluminum which is excellent to lower its weight and to provide high durability and high thermal expansion coefficient property, for example, in an automobile to increase such fuel efficiency and stable running is increasing. Some part such as a piston part of an engine composing the automobile is being used under severe condition including such as pressure and temperature to improve fuel efficiency and lower hazardous substances in the exhaust. For example, a piston thread portion formed in the piston of the engine which is under severe use condition requires high abrasion resistant property and strength. Accordingly, application of an aluminum composite material made of an aluminum alloy reinforced by a reinforcement material such as ceramics is increasing in such part.

Such aluminum composite material formed by impregnating the hot solution of the aluminum alloy to the preform for the composite material pre-composed of a reinforcement material of such as particle, short fiber and whisker is well known. For example, when only a certain portion of the part is reinforced, the structural part is integrally formed by cast forming in which the hot solution of the aluminum alloy is pored into the metal mold after the preform for the composite material is installed at the potion where the certain portion is formed. For example, when the piston in which the above piston thread portion is reinforced is formed, the piston in which the thread portion is reinforced is integrally formed by casing the hot solution of the aluminum alloy with high pressure after the preform for the composite material using aluminum borate whisker as the reinforcement material is installed at the piston ring thread portion forming position of the casting metal mold for the piston. Aluminum borate whisker is being optimally used because it has excellent abrasion resistant and strong property and is relatively inexpensive.

For example, the preform for the composite material composed of the aluminum borate whisker can be formed by sintering at approximately 1200° C. after stirring the aluminum borate whisker and an alumina sol as inorganic binder in water and suctioning water of the aqueous mixture using a certain filter, which is a general method to form a preform for a composite material. In the preform for the composite material, each adjacent aluminum borate whisker is bound respectively by gelation of the alumina sol and crystallization.

On the other hand, the preform for the composite material composed of the aluminum borate whisker is disclosed in Japanese Laid Open Patent Publication H9-316566, which is formed by adding an inorganic binder (alumina sol) to aqueous mixture of a ceramics particle (titanium oxide), an aluminum borate whisker, a potassium titanate whisker, a short fiber (alumina fiber), and powder with sintering property (such as graphite) followed by sintering at certain temperature after suctioning water. The preform for the composite material has a structure in which the ceramics particle adheres on the surface of the aluminum borate whisker. A potassium titanate whisker has a superior sintering property and eases directly or indirectly to bind the ceramic particle and the aluminum borate whisker by sintering with them. Further, the binding force which can hold such binding status is performed by action of the inorganic binder on sintering the ceramic particle and the aluminum borate whisker. Then, the aluminum composite material having an excellent abrasion resistant property is formed by impregnating a hot solution of an aluminum alloy to the preform for the composite material. Further, volumetric percentage of the potassium titanate whisker is adjusted less than 5% because the potassium titanate whisker softens the preform for the composite material and acts to lower its strength.

Meanwhile even though the inorganic binder is added and the sintering temperature is set to relatively high approximately 1200° C., the preform for the composite material formed from the aluminum borate whisker and the inorganic binder cannot be strong sufficiently because the binding force of each whisker is weak. Accordingly, when cast forming in which the hot solution of the aluminum alloy is impregnated is carried out at relatively high pressure to increase impregnating property of the hot solution, problematic deformation and break take place easily. The aluminum composite material formed from such preform for the composite material having insufficient strength could not satisfy required property for an engine piston.

On the other hand the preform for the composite material comprising the aluminum borate whisker formed based on Japanese Laid Open Patent Publication H9-316566 had limited strength because the binding force sintering the aluminum borate whisker, the ceramics particle and the potassium titanate whisker depended mainly on crystallization of the inorganic binder. Accordingly there was limitation to increase productivity because it was difficult to use high impregnation pressure and increase impregnation rate on cast forming. Further, the abrasion resistant property increased by addition of the aluminum borate whisker was possibly lowered because the potassium titanate whisker was relatively soft. Further, in such preform for the composite material, a powder with burnout property was added to increase impregnating property of the hot solution and during sintering the powder with burnout property was burnt out to increase breathability and generally graphite or activated charcoal was used as the powder with burnout property. Nevertheless the aluminum composite material in which graphite or activated charcoal was burnt out had limitation in performing sliding property and vibration damping property because graphite and activated charcoal was active to increase sliding property and vibration damping property of the aluminum composite material.

DETAIL DESCRIPTION OF THE INVENTION

According to the invention, a preform for a composite material which can form a composite material which may perform an excellent abrasion resistance property and a high strength to resolve the above issues, an aluminum composite material compounding the preform for the composite material and an aluminum alloy, and a manufacturing method of the same are disclosed.

According to an implementation of one embodiment of the invention, a preform for the composite material is formed by sintering a pre-mixture including a potassium titanate whisker in the range of 5% to 20% by volume, in which at least an aluminum borate whisker and a potassium titanate whisker are almost homogeneously mixed, at certain temperature to bind titanium oxide produced by the reaction of the aluminum borate whisker and the potassium titanate whisker to the surface of the aluminum borate whisker. The certain temperature is optimally in the range of approximately 800° C. to 1300° C. which is generally applied to sinter a preform.

In such composition, the aluminum borate whisker and the potassium titanate whisker react by sintering the pre-mixture in which the aluminum borate whisker and the potassium titanate whisker are almost homogeneously being mixed and titanium oxide formed by the reaction is bound to the surface of the potassium titanate whisker. The reaction of the aluminum borate whisker and the potassium titanate whisker not only binds both together, but also forms titanium oxide and binds this titanium oxide to the surface of the aluminum borate whisker, and therefore the binding force of the bond is stronger than the binding force based on traditional inorganic binder and accordingly the preform for the composite material can perform high strength. Further, the preform for the composite material formed by binding titanium oxide and the aluminum borate whisker having an excellent abrasion resistant property can farther increase the abrasion resistant property of the aluminum composite material formed by impregnation of the aluminum alloy, because the titanium oxide has an excellent abrasion resistant property. According to the invention, the potassium titanate whisker, in which lowering the abrasion resistant property is generally concerned when it is added in large amount, reacts with the aluminum borate whisker to dissolve and form titanium oxide and if sufficient reaction amount is secured, the strength and the abrasion resistant property can be increased.

The preform for the composite material is formed by sintering the pre-mixture including the potassium titanate whisker in the range of 5% to 20% by volume. Such volumetric percentage promotes the reaction of the potassium titanate whisker and the aluminum borate whisker, and also can secure sufficient amount the reaction, and accordingly the preform for the composite material becomes in bound status which is almost even and strong and can produce sufficient amount of titanium oxide to increase abrasion resistant property for the composite material. If the volumetric percentage of the potassium titanate whisker is less than 5%, the reaction does not take place sufficiently and the preform for the composite material cannot perform sufficient strength. Further, the abrasion resistant property for the composite material may be lowered due to existence of the potassium titanate whisker. If the volumetric percentage is larger than 20%, the strength of the preform for the composite material is lowered because of increasing own volume of the preform for the composite material.

Further, the titanium oxide formed by the reaction of the potassium titanate whisker and the aluminum borate whisker is composed of almost same amount of relatively stable rutile-type and instable anatase-type, and such preform for the composite material comprises a structure in which both types of titanium oxide are bound respectively to the surface of the aluminum borate whisker. The aluminum composite material formed from the preform for the composite material can perform high strength and hardness because the anatase-type titanium oxide easily reacts with an aluminum alloy to form hard titanium-aluminum compound, Further, the anatase-type titanium oxide converts to a rutile-type at general sintering temperature (higher than approximately 1000° C.). Therefore even if an anatase-type titanium oxide particle is added to the pre-mixture in advance, the preform for the composite material including rutile-type titanium oxide is formed. Accordingly, the preform for the composite material of the invention can form the aluminum composite material to be able to perform higher strength in comparison with traditional above preform for the composite material formed by adding titanium oxide and sintering.

The aluminum composite material compounded with the aluminum alloy can be formed adequately without deformation or break during cast forming in which the hot solution of the aluminum alloy is being impregnated because the preform for the composite material of the invention has the high strength. Further, impregnating pressure and rate on cast forming can be farther increased and accordingly the productivity can be increased as an advantage. Thus, the composite material which can perform an excellent abrasion resistant property and the high strength can be formed from the preform for the composite material.

According to an implementation of another embodiment of the invention, the above pre-mixture including the aluminum borate whisker in the range of 10% to 20% by volume is disclosed. In the preform for the composite material having such composition, the abrasion resistant property of the composite material compounding with such as the aluminum alloy can be increased by containing the aluminum borate whisker having an excellent abrasion resistant property. If the volumetric percentage of the aluminum borate whisker is less than 10%, a composite material which can perform sufficiently an abrasion resistant property cannot be formed. Further, an amount of the aluminum borate whisker becomes lower so that sufficient amount of titanium oxide cannot be formed. In contrast, if a volumetric percentage is larger than 20%, the volume of the preform for the composite material becomes higher so that the strength of the preform for the composite material can be lowered.

According to an implementation of another aspect of the invention, the composition including such aluminum borate whisker which has larger average fiber diameter and longer average fiber length in comparison with the potassium titanate whisker is disclosed. Accordingly, the potassium titanate whisker which is more easily sintered than the aluminum borate whisker is almost totally homogeneously dispersedly contacting to the aluminum borate whisker in the pre-mixture so that it can react relatively easily with a respectively adjacent aluminum borate whisker on sintering. Thus, the above reaction of the aluminum borate whisker and the potassium titanate whisker totally almost evenly takes place so that the preform for the composite material can perform totally high strength because it is in the status that titanium oxide is almost homogeneously bound. Further, the average fiber diameter and the average fiber length are the average value of fiber diameter and fiber length of each fiber used, and these are varied in near range of the average values.

According to an implementation of another embodiment of the invention, the composition including the aluminum borate whisker which has an average fiber diameter in the range of 0.5 μm to 5 μm and has a short fiber form with an average fiber length in the range of 10 μm to 50 μm is disclosed. If the average fiber diameter or the average fiber length of the aluminum borate whisker is larger than the range, it will be bent or easily complexly intertwined status so that the preform for the composite material cannot perform sufficient strength. Further, if the average fiber diameter or the average fiber length is smaller than the range, the preform for the composite material also cannot perform sufficient strength.

According to an implementation of another embodiment of the invention, the composition including the potassium titanate whisker which has an average fiber diameter in the range of 0.1 μm to 1 μm and an average fiber length in the range of 5 μm to 20 μm is disclosed. According to such composition, it can be a status in which relatively large amount of the potassium titanate whisker can contact to the aluminum borate whisker so that both in the pre-mixture can react relatively easily on sintering. If the average fiber diameter or the average fiber length is larger than the range, the amount of the potassium titanate whisker contacting to the aluminum borate whisker lowers so that the reaction rate becomes low. Further, if the average fiber diameter or the average fiber length is shorter than the range, it is not good for handling and difficult to be obtained.

According to an implementation of one embodiment of the invention, the composition including the above pre-mixture including an alumina short fiber is disclosed. According to such composition, the strength of the preform for the composite material can be increased by including the alumina short fiber having relatively large average fiber diameter.

According to an implementation of one embodiment of the invention, the composition including the pre-mixture including graphite and/or activated charcoal; wherein the pre-mixture is sintered at certain temperature in which the graphite and/or the activated charcoal form a binding status with the aluminum borate whisker is disclosed. According to such composition, the composition includes graphite and/or activated charcoal having excellent lubricating property and vibration property and the composite material formed from the preform for the composite material can perform excellent sliding property and vibration damping property, and can be applied to a product and its specific part requiring strictly such properties accordingly.

According to an implementation of one embodiment of the invention, a manufacturing method including a mixing process to mix at least an aluminum borate whisker and a potassium titanate whisker in water and prepare an aqueous mixed solution, a dehydration process to remove water from the aqueous mixed solution and form a pre-mixture including the potassium titanate whisker in the range of 5% to 20% by volume, and sintering process to subject the aluminum borate whisker and the potassium titanate whisker to react by sintering to form titanium oxide and bind the titanium oxide to the surface of the aluminum borate whisker is disclosed. In such manufacturing process, the pre-mixture in which the aluminum borate whisker and the potassium titanate whisker are almost homogeneously co-existing is formed by the mixing process and the dehydration process. Then, the sintering process subjects the aluminum borate whisker and the potassium titanate whisker co-existing in the pre-mixture to react, bind them, separate and form titanium oxide, and bind the titanium oxide to the surface of the aluminum borate whisker. The preform for the composite material is formed accordingly. Further, in the mixing process, the pre-mixture including the potassium titanate whisker in the range of 5% to 20% by volume is formed by adjusting the additional amount of the potassium titanate whisker in advance. According to the above manufacturing method, the preform for the composite material described above can be optimally produced.

According to an implementation of one embodiment of the present invention, a manufacturing method in which the pre-mixture formed by the dehydration process includes the aluminum borate whisker in the range of 10% to 20% by volume is disclosed. The pre-mixture having such volumetric percentage can be formed by adjusting the additional amount of the aluminum borate whisker in the mixing process. According to this manufacturing method, the preform for the composite material disclosed above can be optimally produced.

According to an implementation of another embodiment, in the above manufacturing method of the preform for the composite material, a manufacturing method in which the aluminum borate whisker has larger average fiber diameter and longer average fiber length than which the potassium titanate whisker has is disclosed.

In such manufacturing method, the mixed aqueous solution in which the potassium titanate whisker which is more easily sintered than the aluminum borate whisker is mixed almost homogeneously can be formed relatively easily by the mixing process, and the pre-mixture totally homogenized can be formed by the dehydration process. Accordingly the reaction of the aluminum borate whisker and the potassium titanate whisker can totally almost evenly take place in the sintering process, and the preform for the composite material in which each whisker and titanium oxide are almost evenly bound can be relatively easily formed accordingly. According to this manufacturing method, the above preform for the composite material disclosed above can be optimally produced.

Further, according to an implementation of one embodiment, a manufacturing method using the aluminum borate whisker which has an average fiber diameter in the range of 0.5 µm to 5 µm and an average fiber length in the range of 10 µm to 50 µm with a short fiber shape is disclosed. A mixed aqueous solution in which the aluminum borate whisker is almost homogeneously dispersed can be formed relatively easily by the mixing process. According to this manufacturing method, the preform for the composite material disclosed above can be optimally produced.

Further, according to an implementation of one embodiment, a manufacturing method using the potassium titanate whisker which has an average fiber diameter in the range of 0.1 µm to 1 µm and an average fiber length in the range of 5 µm to 20 µm with a short fiber shape is disclosed. A mixed aqueous solution in which the potassium titanate whisker is almost homogeneously dispersed can be formed relatively easily by the mixing process. Accordingly, the potassium titanate whisker and the aluminum borate whisker react almost in all area of the pre-mixture in the sintering process and the totally homogeneous preform for the composite material can be easily formed. According to this manufacturing method, the preform for the composite material disclosed above can be optimally produced.

According to an implementation of one embodiment, a manufacturing method of the preform for the composite material in which an alumina short fiber is added to prepare a mixed aqueous solution in the mixing process is disclosed. According to this manufacturing method, the preform for the composite material disclosed above can be optimally produced.

Further, according to an implementation of one embodiment, a manufacturing method in which graphite and/or activated charcoal is added to prepare a mixed aqueous solution in the mixing process and the graphite and/or the activated charcoal, which is burnt out, is bound with the aluminum borate whisker in the sintering process is disclosed. Graphite and/or activated charcoal is easily lost by oxidation at high temperature and a pre-mixture must be sintered under vacuum or in an inert gas in a sintering process accordingly. According to this manufacturing method, the preform for the composite material disclosed above can be optimally produced.

On the other hand according to an implementation of another embodiment of the present invention, the present invention relates to a manufacturing method of a preform for a composite material includes the hot solution impregnation process in which the hot solution of aluminum alloy is impregnated to the preform for the composite material disclosed above by pressurized casting. The hot solution of the aluminum alloy can be easily and sufficiently impregnated to the preform for the composite material disclosed above by the hot solution impregnating process. Accordingly, an aluminum composite material which can perform an excellent abrasion resistant property and high strength originated in the above preform for the composite material and an excellent sliding property and vibration damping property originated in graphite or activated charcoal can be formed. Further as described above, anatase type titanium oxide is bound to the surface of the aluminum borate whisker in the preform for the composite material, and accordingly the aluminum alloy impregnated in the hot solution impregnating process and anatase type titanium oxide can react easily and form hard titanium-aluminum compound, and the aluminum composite material which can perform high strength and hardness can be formed accordingly.

Further, according to an implementation of of another embodiment of the present invention, a manufacturing method in which after the preform for the composite material is installed to a specific portion of a cavity formed in a certain metal mold, the hot solution enters into the cavity in the hot solution impregnating process, and the composite portion in the hot solution impregnates to the preform for the composite material and a metal portion composed of aluminum alloy are integrally formed is disclosed. Accordingly such manufacturing method integrally casts and forms an aluminum alloy product in which a specific portion is reinforced by the preform for the composite material. Therefore strength of the boundary surface between the metal portion and the composite portion is sufficiently secured and an occurrence of such as a break due to such as stress concentration can be adequately prevented. Based on this manufacturing method, for example, an engine piston of which the thread portion of the piston ring is partially reinforced can be relatively easily formed.

On the other hand, according to an implementation of another embodiment, the present invention relates to an aluminum composite material in which the hot solution of an aluminum alloy is impregnated to the preform for the composite material disclosed above by pressurized casing. Such aluminum composite material can perform an excellent abrasion resistant property and high strength originated in the above preform for the composite material disclosed in above and an excellent sliding property and vibration damping property originated in graphite or activated charcoal. Further the anatase type titanium oxide which is bound to the surface of the aluminum borate whisker of the preform for the composite material and an aluminum alloy are easily react to form hard titanium-aluminum compound, and the aluminum composite material can perform high strength and hardness accordingly. According to the manufacturing method disclosed above, the aluminum composite material can be adequately produced.

According to an implementation of one embodiment, a composition in which the composite portion in which the aluminum alloy is impregnated to the preform for the composite material and a metal portion composed of aluminum alloy in the above aluminum composite material are integrally formed is disclosed. According to such composition, a specific portion which is especially required to have an abrasion resistant property and strength is only reinforced. Further the boundary surface between the metal portion and the composite portion becomes strong and an occurrence of such as a break due to such as stress concentration can be prevented accordingly and the aluminum composite material of the invention can perform high durability. Such aluminum composite material, for example, can be adequately used for an engine piston of which the piston ring thread portion is a composite portion. Further such aluminum composite material can be adequately formed according to the manufacturing method disclosed above.

EMBODIMENTS

The inventor describes the embodiments of the invention referring to figures.

Figures 1A, 1B:
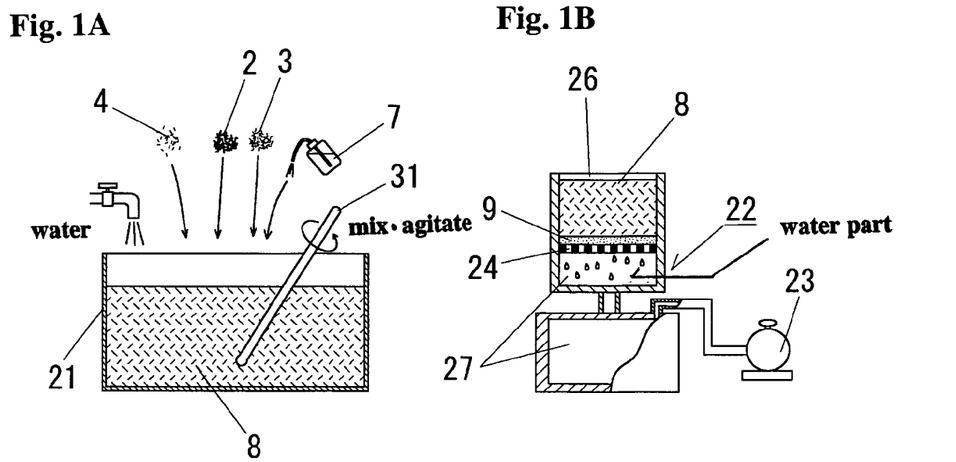
FIGS. 1A–1C are figures illustrating a manufacturing process to form preform 1 for the composite material according to an implementation of the embodiment of the invention.
Figure 1C:
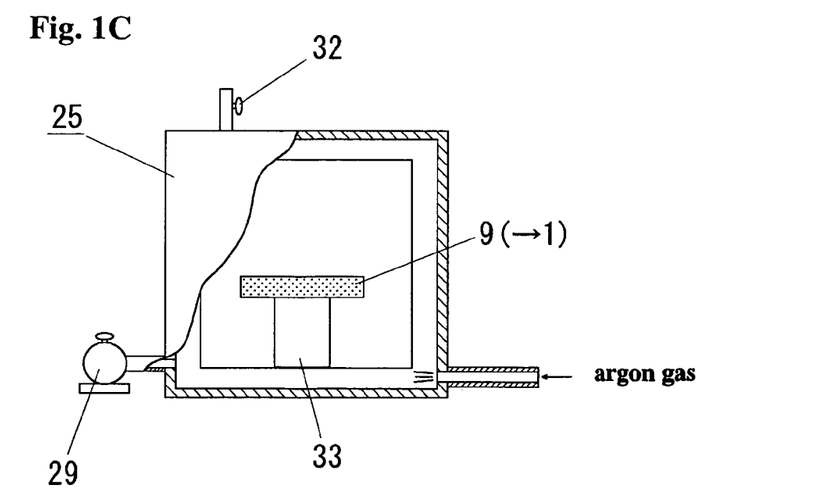

FIG. 1 is a figure illustrating an process to manufacture preform 1 for the composite material. FIG. 1A is illustrating a mixing process wherein mixed aqueous solution 8 was prepared by stirring with stirring rod 31 and mixing almost homogeneously each reinforcement material in water in a certain vessel 21. Mixed aqueous solution 8 was transferred to suction forming means 22 connected to vacuum pump 23 from vessel 21. FIG. 1B is illustrating a dehydration process wherein pre-mixture 9 was obtained from mixed aqueous solution 8 by suctioning water with vacuum pump 23 through filter 24. Pre-mixture 9 was taken out from suction forming means 22 and dried well. (Figure is not shown.) FIG. 1C is illustrating a sintering process wherein pre-mixture 9 was installed on table 33 in heating furnace 25, and after the inside of heating furnace 25 became under vacuum condition by vacuum pump 29 connected to heating furnace 25, desired preform 1 for the composite material was obtained by heating and sintering in argon gas.

Figure 2A:
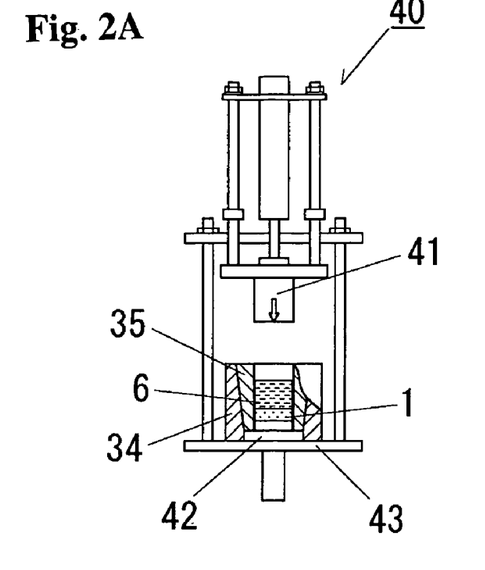
FIGS. 2A–2D are figures illustrating an impregnating process of a hot solution to form aluminum composite material 10 according to an implementation of embodiment of the invention.

Then aluminum composite material 10 was formed by the hot solution impregnating process (FIG. 2) in which the hot solution of aluminum alloy 6 was impregnated to preform 1 for the composite material. According to an implementation of the embodiment of the invention, aluminum composite material 10 was formed integrally from aluminum composite portion 10a formed by impregnating aluminum alloy 6 to preform 1 for the composite material and aluminum alloy portion 10b composed of aluminum alloy 6. Referring to FIG. 2A, in the forming process of aluminum composite material 10, after preform 1 for the composite material was installed in metal mold 34 installed to hydraulic press machine 40 for pressurized casing, a certain amount of the hot solution of aluminum alloy 6 was poured. Referring FIG. 2B and FIG. 2C, the hot solution was directly pressurized by pressurized punch 41 of hydraulic press machine 40 to impregnate the hot solution to preform 1 for the composite material. Then referring to FIG. 2D, after removing pressure, metal mold 34 was taken out and aluminum composite material 10 in which aluminum composite portion 10a and aluminum alloy portion 10b were integrally formed as layers was obtained. Thus the cast forming process to cast aluminum composite material 10 was the hot solution impregnating process to impregnate the hot solution of aluminum alloy 6 to preform 1 for the composite material.

Referring to the embodiments, the inventor describes detail of the manufacturing process of preform 1 for the composite material, the hot solution impregnating process to impregnate aluminum alloy 6 to preform 1 for the composite material, and preform 1 for the composite material and aluminum composite material 10 formed respectively in each process.

[Embodiment 1]

The inventor describes step by step each process to produce preform 1 for the composite material.

In the above mixing process referring to FIG. 1A, the following reinforcement materials were added to water in vessel 21.

Figure 3A:
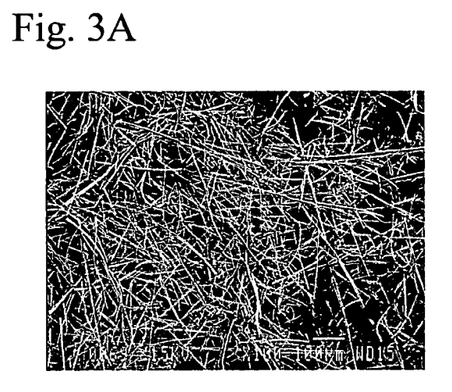
FIGS. 3A–3E are magnified photographs showing alumina short fiber 2, aluminum borate whisker 3, potassium titanate whisker 4, activated charcoal 5, and titanium oxide 11.
Figure 3B:
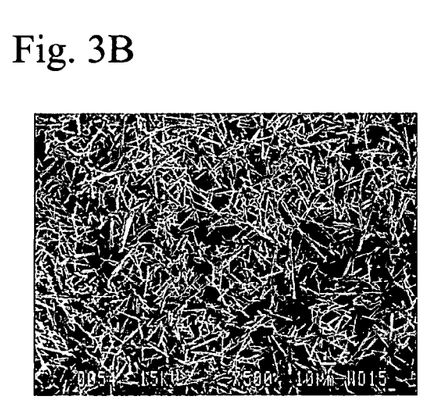
Figure 3C:
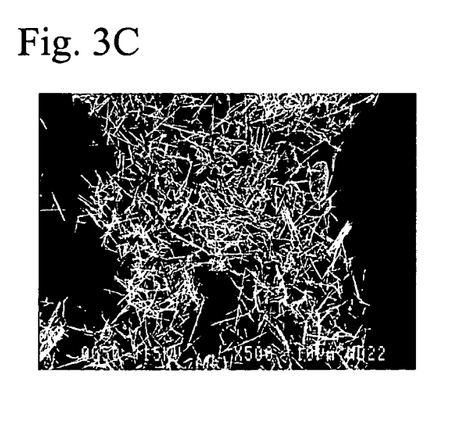

(i) Alumina short fiber 2 (FIG. 3A; 5 μm of average fiber diameter, 500 μm of average fiber length)
(ii) Aluminum borate whisker 3 (FIG. 3B; 1 μm of average fiber diameter, 30 μm of average fiber length)
(iii) Potassium titanate whisker 4 (FIG. 3C; 0.5 μm of average fiber diameter, 10 μm of average fiber length);

And further alumina sol 7 ($Al_2O_3$ (approximately 11%)) was added. Mixed aqueous solution 8 in which each reinforcement material were co-existing almost homogeneously was obtained by stirring the aqueous solution including such reinforcement materials with stirring rod 31. According to an implementation of embodiment 1 (embodiment 2 described later) of the invention, the inorganic binder acted so as to bind together each reinforcement material to prevent deformation and breaking of pre-mixture 9 when pre-mixture 9 was transferred from the dehydration process (described later) to the sintering process (transfer from FIG. 1B to FIG. 1C). Specifically, the form of pre-mixture 9 was saved by the binding force of the inorganic binder. Further, an average fiber diameter and an average fiber length are respectively an average value of fiber diameter and fiber length of short fiber and whisker, and these varied within near the range of the average values.

Then mixed aqueous solution 8 was transferred to suction forming means 22 to carry out the above dehydration process (FIG. 1B). In suction forming means 22, cylinder like aqueous solution reservoir region 26 into which mixed aqueous solution 8 enters, filter 24 forming underside of aqueous solution reservoir region 26, and water reservoir region 27 in which water fractionated and suctioned by filter 24 was reserved were installed, and vacuum pump 23 was connected to water reservoir region 27. In this dehydration process, after above mixed aqueous solution 8 was entered into aqueous solution reservoir region 26 of suction forming means 22, vacuum pump 23 was driven to suction water of mixed aqueous solution 8 through filter 24. Accordingly, column like pre-mixture 9 in which above each reinforcement material was co-existing was obtained. Further, pre-mixture 9 was taken out from suction forming means 22, put into such as drying oven at approximately 120° C. and water was removed well. (Figure is not shown.) In pre-mixture 9, each reinforcement material had not reacted and each reinforcement material was bound with alumina sol 7 and the structure of pre-mixture 9 was maintained accordingly. Accordingly when the next transportation was carried out to heating furnace 25, deformation and breaking of pre-mixture 9 could be prevented. Further each volumetric percentage of each reinforcement material was approximately 3% for alumina short fiber 2, approximately 15% for aluminum borate whisker 3, approximately 6% for potassium titanate whisker 4 and the rest for unfilled pore. A certain amount of each reinforcement material was formulated in the above mixing process to provide such volumetric percentage.

Figure 4A:
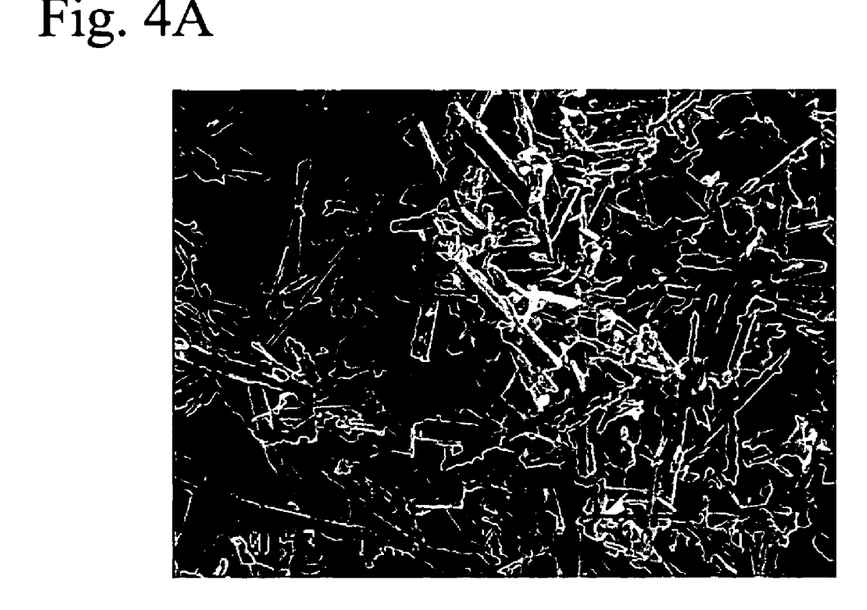
FIGS. 4A–4B are magnified photographs showing preform A for the composite material (preform 1 for the composite material) and aluminum composite material A (aluminum composite material 10) according to embodiment 1 of the invention.

Referring to FIG. 1C, the inventor describes the above sintering process. Pre-mixture 9 was installed on table 33 in heating furnace 25 and vacuum pump 29 was driven to set under vacuum at 10 Pa in the inside of heating furnace 25. Then after, the inside of the furnace was heated up to approximately 1150° C. which was held for one hour while 5 L/min of argon gas was being flown. And the furnace was cooled down to room temperature (Figure is not shown.) and column like preform 1 for the composite material was obtained. Referring to FIG. 4A showing a magnified photo, in preform 1 for the composite material, adjacent aluminum borate whisker 3 was bound each other and titanium oxide 11 was bound as a film on the surface of aluminum borate whisker 3.

Specifically, in this sintering process, potassium titanate whisker 4 reacted with adjacent aluminum borate whisker 3 to separate and produce almost same amount of rutile type and anatase type titanium oxide 11 in pre-mixture 9. According to this reaction, potassium titanate whisker 4 and aluminum borate whisker 3 were bound strongly and also titanium oxide produced by the reaction was bound to the surface of aluminum borate whisker 3 under rutile type and anatase type status were being held. Each reinforcement material formed strong binding status each other by the reaction of potassium titanate whisker 4 and aluminum borate whisker 3 and preform 1 for the composite material which had high strength was formed. Preform for the composite material according to embodiment 1 is now described as preform A for the composite material to avoid confusion in embodiment 2 and comparison embodiment 1 to 3.

Aluminum composite material 10 was cast and formed by the hot solution impregnating process described in FIG. 2 (cast forming process) from preform 1 for the composite material (preform A for the composite material) formed above. Hydraulic press machine 40 having pressurized punch 41, of which driving was controlled up-and-down direction by oil pressure, in the upper part, and metal mold 34 into which bush 35 forming column like forming region was inserted were used in the hot solution impregnating process. Casting table 43 was installed in the lower part of hydraulic press machine 40 and extrusion portion 42 driving upward-and-downward along with a moving axis of pressurized punch 41 was installed on the center of casting table 43. Metal mold 34 was set on casting table 43 so that lower portion of bush 35 was installed on extrusion portion 42. Specifically, bush 35 inserted into metal mold 34 was able to be removed from metal mold 34 by moving extrusion portion upward. Metal mold 34 and bush 35 were held in approximately 200° C. to 250° C. during the hot solution impregnating process.

Figure 2B:
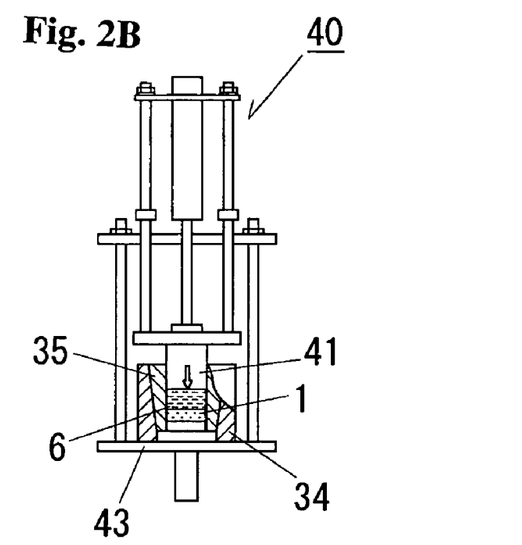
Figure 2C:
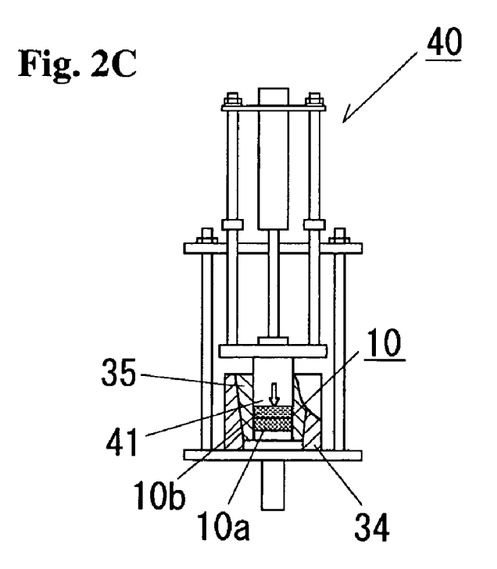
Figure 2D:
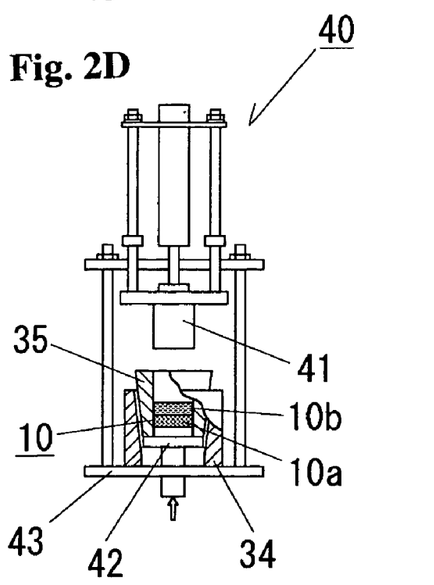
Figure 4B:
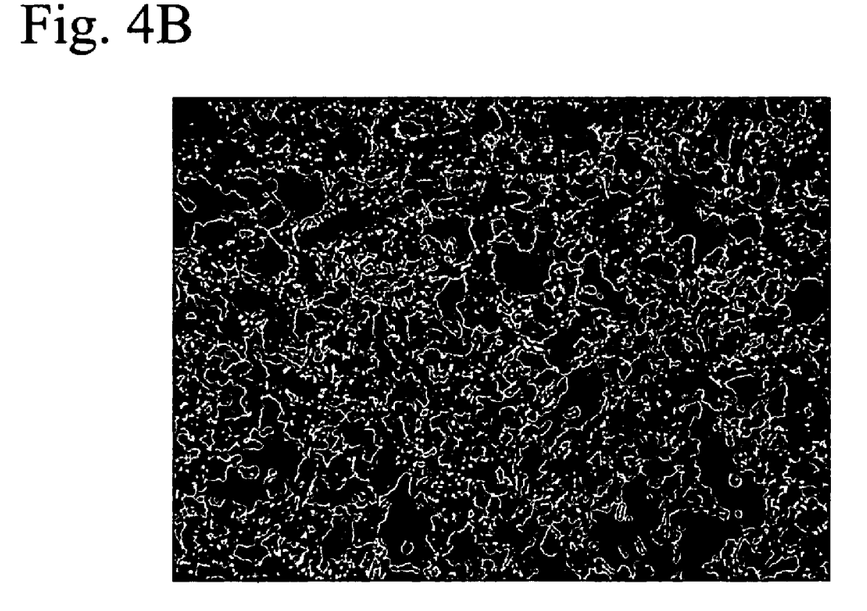

Then, referring to FIG. 2B, in the hot solution impregnating process (cast forming process), preform 1 for the composite material (preform A for the composite material) which was pre-heated to approximately 470° C. was installed in bush 35 of metal mold 34 installed in hydraulic press machine 40. Then after, the hot solution of aluminum alloy 6 (JIS AC8A) at approximately 760° C. was entered into bush 35 in which preform 1 for the composite material was arranged. Referring to FIG. 2B, the hot solution of aluminum alloy 6 being reserved in bush 35 was directly pressurized by moving pressurized punch 41 downward. Pressurized punch 41 was controlled to pressurize the hot solution with approximately 300 atm pressure. Referring to FIG. 2C, the hot solution was impregnated to preform 1 for the composite material by pressurizing with pressurized punch 41. Accordingly, aluminum composite material 10, in which aluminum composite portion 10a, in which the hot solution impregnated to preform 1 for the composite material, and aluminum alloy portion 10b were formed as an integral layered structure was formed. Referring to FIG. 2D, after pressurized punch 41 moved upward by removing pressure, bush 35 was removed from metal mold 34 by driving extrusion portion 42 upward. And then preform 1 for the composite material of the embodiment was taken out from bush 35. Referring to magnified photo in FIG. 4B, aluminum composite portion 10a of aluminum composite material 10 had no unfilled pore and each reinforcement material and aluminum alloy 6 were strongly bound. Further, titanium-aluminum compound 14 which was produced by the reaction of anatase type titanium oxide 11 included in preform A for the composite material and aluminum alloy 6 was also confirmed. Aluminum composite material 10 according to embodiment 1 is also described as aluminum composite material A as well as above preform for the composite material.

[Embodiment 2]

Figure 3D:
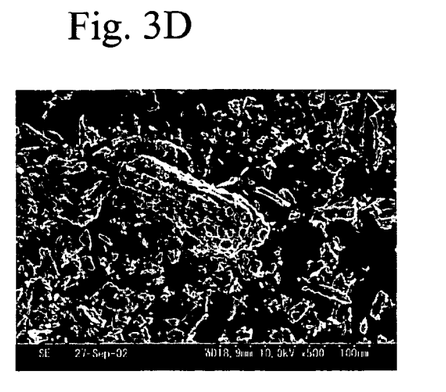
Figure 3E:
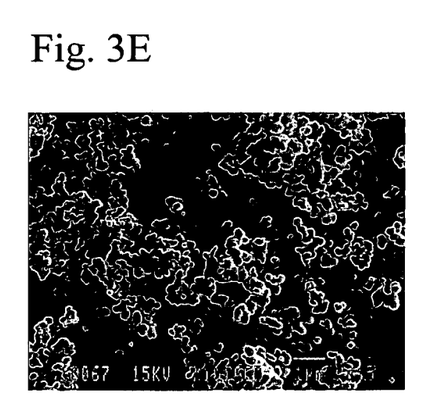
Figure 5A:
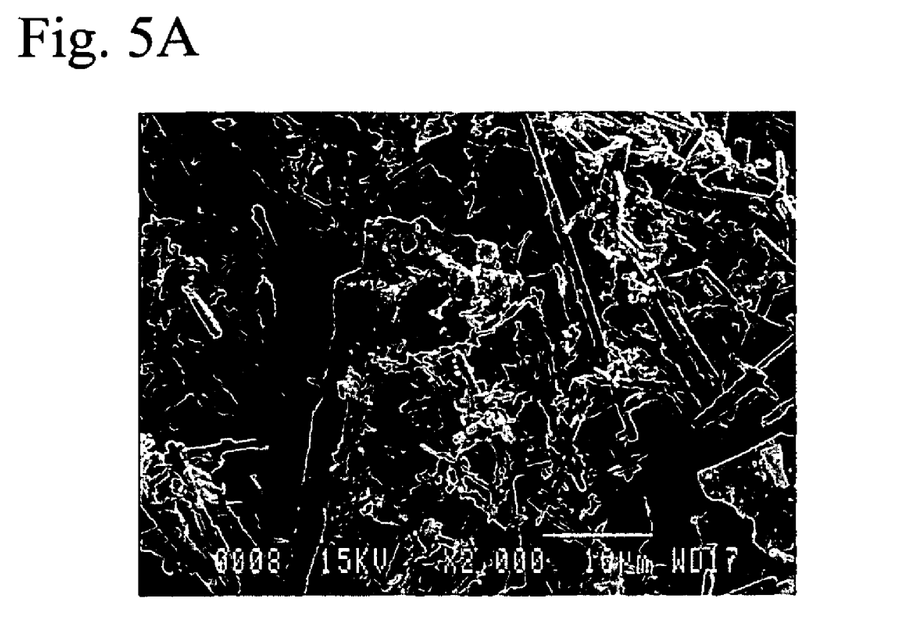
FIGS. 5A–5B are magnified photographs showing preform B for the composite material and aluminum composite material B according to embodiment 2 of the invention.

According to an implementation of embodiment 2 of the invention, referring to FIG. 1A, in the mixing process of embodiment 1, activated charcoal 5, referring FIG. 3D, having average particle diameter approximately 90 μm and chemical content 97% of C and approximately 3% of $Al_2O_3$ and $SiO_2$ was added and almost homogeneous mixed aqueous solution was prepared. The activated charcoal used was porous type. Preform B for the composite material according to embodiment 2 was formed from the mixed aqueous solution by the dehydration process (refer to FIG. 1B) and the sintering process (refer to FIG. 1C). Referring FIG. 5A, in preform B for the composite material, activated charcoal was not oxidized and was not lost during sintering process, and was sintered to alumina short fiber 2 or aluminum borate whisker 3 and existed. In preform B for the composite material as well as preform A for the composite material, aluminum borate whisker 3 and potassium titanate whisker 4 reacted to separate and form titanium oxide 11 and titanium oxide 11 was bound as a film to the surface of aluminum borate whisker 3. Further, an average particle diameter as well as the average fiber diameter and the average fiber length is an average of particle diameter of particle utilized and these varies within near the range of the average value.

Figure 5B:
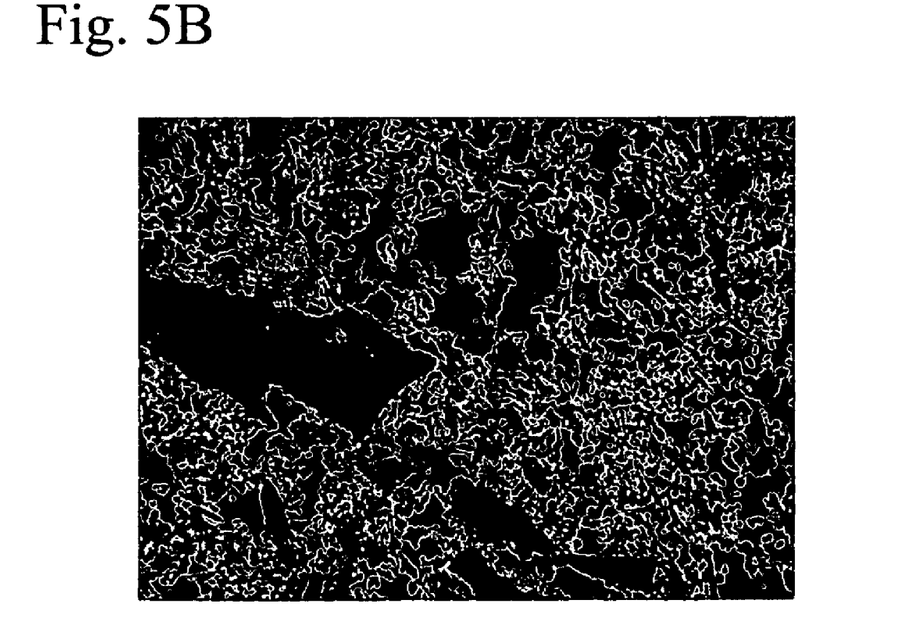

According to the hot solution impregnating process, referring to FIG. 2, aluminum composite material B was formed by impregnating the hot solution of aluminum alloy 6 to preform B for the composite material. In aluminum composite material B as well as in aluminum composite material A according to embodiment 1, the aluminum composite portion and the aluminum alloy portion were integrally formed as a layering structure. In aluminum composite material B as well as in aluminum composite material A according to embodiment 1, aluminum composite portion had no unfilled pore and each reinforcement material such as aluminum borate whisker 3 and aluminum alloy 6 were strongly bound. (FIG. 5B) Titanium-aluminum compound 14 formed by the reaction of anatase type titanium oxide 11 included in preform B for the composite material as well as in preform A for the composite material according to embodiment 1 and aluminum alloy 6 was confirmed and also activated charcoal 5 was confirmed.

According to an implementation of embodiment 2 of the invention, the same material, the same equipment, the same method but addition of activated charcoal 5 to prepare the mixed aqueous solution in the mixing process were used and an explanation was omitted.

The inventor describes comparison embodiments to compare with embodiment 1 and embodiment 2 of the invention.

[Comparison Embodiment 1]

According to comparison embodiment 1, reinforcement materials including alumina short fiber 2 (referring to FIG. 3A), aluminum borate whisker 3 (referring to FIG. 3B), potassium titanate whisker 4 (referring to FIG. 3C) which were used in above embodiment 1, and particle of titanium oxide 11 (referring to FIG. 3D, 0.5 μm of average particle diameter) were mixed in water in the mixing process (referring to FIG. 1D), alumina sol 7 was added and almost homogeneous mixed aqueous solution was obtained. Amount of each reinforcement material used in comparison embodiment 1 was different from each amount used in embodiment 1 and volumetric percentage of the pre-mixture formed by the mixing process and the dehydration process was approximately 4% for alumina short fiber, approximately 8% for aluminum borate whisker 3, approximately 2% for potassium titanate whisker 4 and approximately 9% for titanium oxide particle. Specifically, mixed ratio of potassium titanate whisker was smaller in comparison with embodiment 1.

Figure 6A:
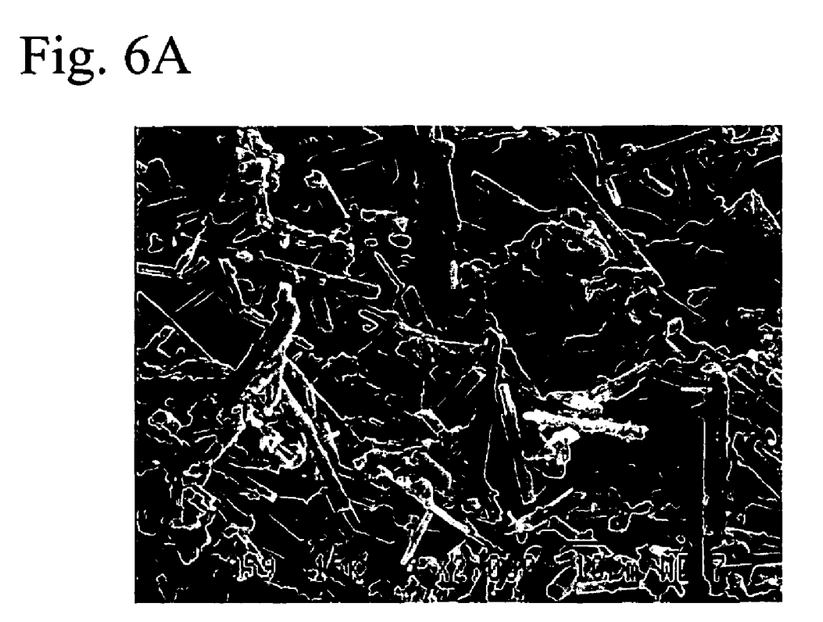
FIGS. 6A–6B are magnified photographs showing preform C for the composite material and aluminum composite material C according to comparison embodiment 1.

Preform C for the composite material according to comparison embodiment 1 was formed from the pre-mixture by sintering through the sintering process as in the embodiment 1 of the invention. Referring to FIG. 6A showing magnified photo, titanium oxide 11 in preform C for the composite material was sintered like a clump on the surface of aluminum borate whisker 3. According to comparison embodiment 1, potassium titanate whisker 4 did not react almost with aluminum borate whisker 3 in the sintering process and was used as supporting sintering between each adjacent reinforcement material because the amount of potassium titanate whisker 4 used was small. Therefore sintering of aluminum borate whisker 3, titanium oxide 11, potassium titanate whisker 4, and alumina short fiber 2 seemed depending on binding force based on crystallization of alumina sol 7. Further, titanium oxide 11 composing preform C for the composite material was rutile type because sintering temperature was 1150° C.

Figure 6B:
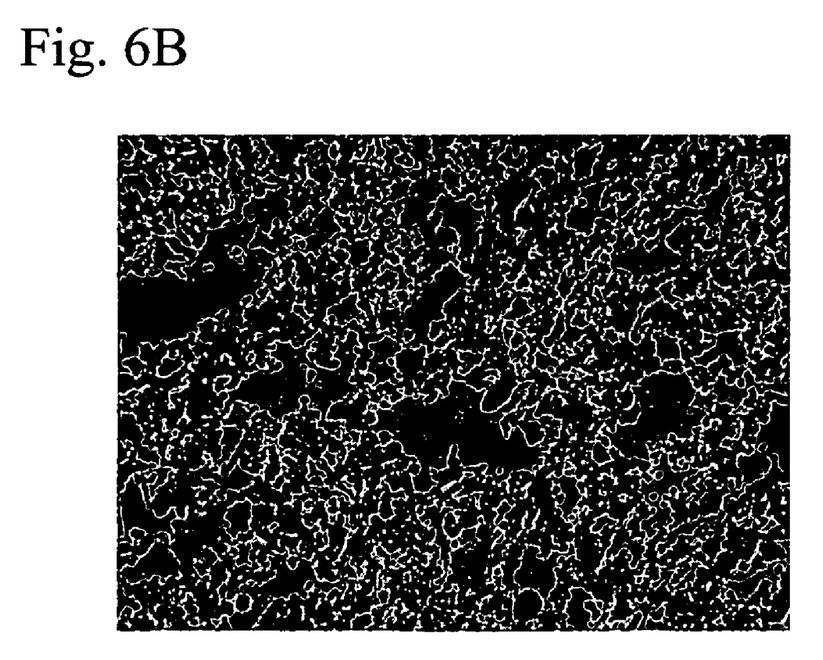

Further aluminum composite material C which had an integral layering structure of aluminum composite portion and aluminum alloy portion was formed by the hot solution impregnating process (cast forming process) according to the above embodiment in which the hot solution of aluminum alloy 6 was impregnated to preform C for the composite material. Referring to FIG. 6B showing a magnified photo, the aluminum composite portion of aluminum composite material C had no unfilled pore and preform C for the composite material and aluminum alloy 6 were bound. Wherein, aluminum composite material C was confirmed as a whisker form in aluminum composite material C. Therefore according to comparison embodiment 1, it was confirmed that aluminum borate whisker 3 and potassium titanate whisker 4 did not react almost.

According to comparison embodiment 1, the same material, the same equipment, the same method as in embodiment 1 except in addition to reinforcement materials mixed according to embodiment 1, particle of titanium oxide 11 was added and ratio of each reinforcement material was changed in the mixing process, and an explanation was omitted.

[Comparison Embodiment 2]

Figure 7A:
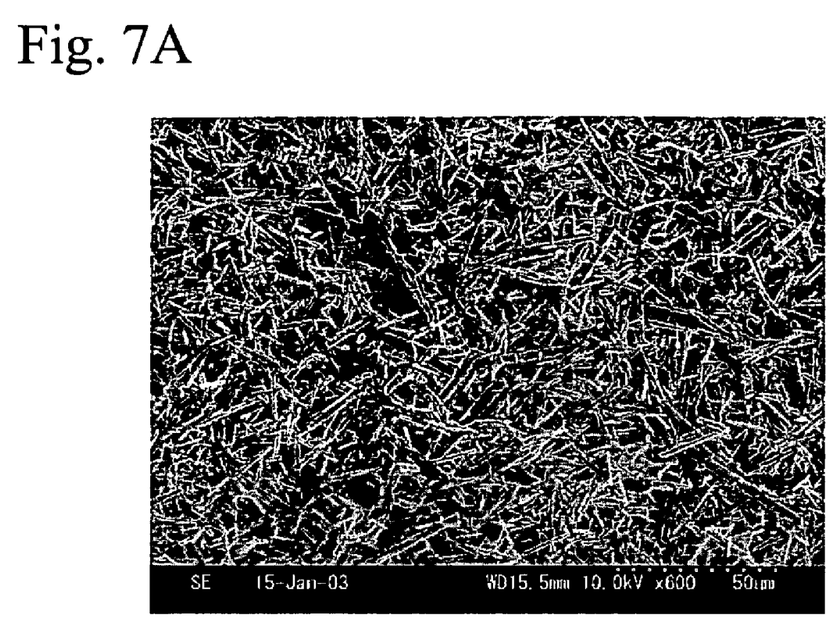
FIGS. 7A–7B are magnified photographs showing preform D for the composite material and aluminum composite material E according to comparison embodiment 2.

According to comparison embodiment 2, only aluminum borate whisker 3 (referring to FIG. 3B) was used as a reinforcement material, and the pre-mixture was prepared by adding alumina sol in the mixing process. Wherein, the aluminum borate whisker was mixed as the pre-mixture formed by dehydration process from the mixed aqueous solution was approximately 24% by volume, and preform D for the composite material was formed by sintering the pre-mixture formed through the dehydration process in the sintering process. Referring to FIG. 7A showing a magnified photo, adjacent aluminum borate whisker 3 was bound each other in preform D for the composite material. Wherein, the binding force seemed depending on the binding force of the alumina sol because aluminum borate whisker 3 had relatively low sintering property. Further aluminum composite material D which had an integral layering structure of aluminum composite portion and aluminum alloy portion was formed by the hot solution impregnating process (cast forming process) according to the above embodiment in which the hot solution of aluminum alloy 6 was impregnated to preform D for the composite material. (Figure is not shown.)

According to comparison embodiment 2, the same material, the same equipment, the same method as in embodiment 1, except aluminum borate whisker 3 and alumina sol were added and the mixed ratio of aluminum borate whisker 3 was changed in the mixing process, and an explanation was omitted.

[Comparison Embodiment 3]

Figure 7B:
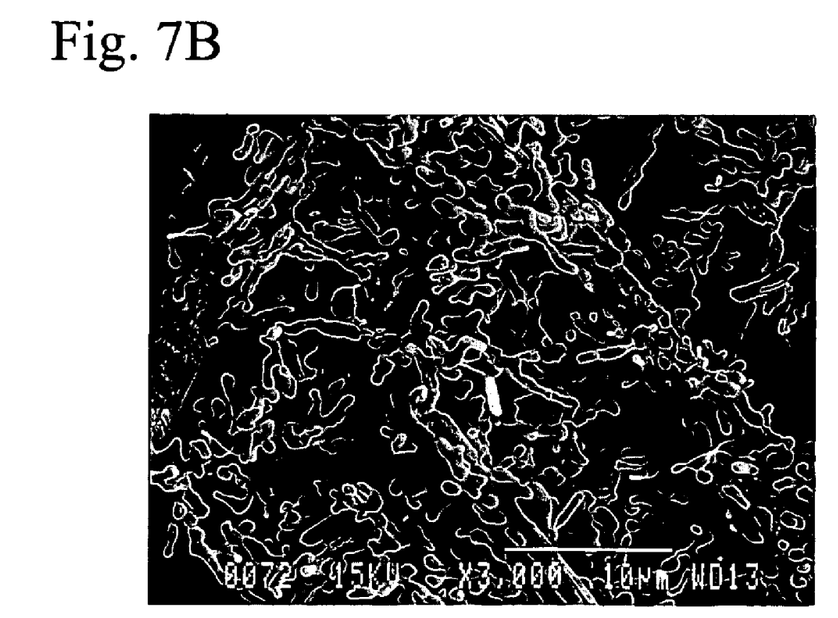

According to comparison embodiment 3, alumina short fiber 2 (referring to FIG. 3A) and potassium titanate whisker 4 (referring to FIG. 3C) were added as reinforcement materials, and the almost homogeneous pre-mixture was prepared by adding alumina sol in the mixing process. Wherein, each reinforcement material was mixed in the mixed aqueous solution as approximately 6% of alumina short fiber 2 and approximately 13% of potassium titanate whisker 4 by volume were in the pre-mixture formed by the dehydration process, and preform E for the composite material was formed by sintering the pre-mixture formed through the dehydration process in the sintering process. Referring to FIG. 7B showing a magnified photo, preform E for the composite material had the structure in which potassium titanate whisker 4 projected on the surface of alumina short fiber 2. Wherein, potassium titanate whisker 4 was relatively easily sintered and was in melted condition, but it did not react with alumina short fiber 2 and was sintered by a binding force based on crystallization of alumina sol. Further aluminum composite material E which had an integral layering structure of aluminum composite portion and aluminum alloy portion was formed by the hot solution impregnating process according to the above embodiment in which the hot solution of aluminum alloy 6 was impregnated to preform E for the composite material. (Figure is not shown.)

According to comparison embodiment 3, the same material, the same equipment, the same method as in embodiment 1, except alumina short fiber 2, potassium titanate whisker 4 and alumina sol were added and the mixed ratio of aluminum borate whisker 3 was changed in the mixing process, and an explanation is omitted.

[Comparison Embodiment 4]

According to comparison embodiment 4, preform 1 for the composite material was not used and aluminum alloy base material F was formed by casting with only aluminum alloy 6 in the above hot solution impregnating process. Compounding effect of preform 1 for the composite material and aluminum alloy 6 was confirmed in the following each experiment by using aluminum alloy base material F which was a single body of aluminum alloy 6.

Compressive strength of each preform for the composite material was tested for each preform A through E for the composite material formed according to each embodiment and comparison embodiment. Further, tensile test, abrasion resistant property test, Vickers hardness test were carried out for tensile strength, abrasion resistant property and hardness of each preform A through E for the composite material and aluminum alloy base material F.

In compressive strength test for the preform for the composite material, each preform A through E for the composite material formed as column like shape having 20 mm of outer diameter and 30 mm of wall thickness was pressed in the wall thickness direction and when plasticity deformation took place, it was the bearing force as compressive strength of each preform for the composite material.

The tensile test for aluminum composite material A through E was carried out following JIS Z2201. In aluminum composite material A through E, the distance between standard points was set approximately 25 mm and each test piece as a column having approximately 5 mm φ was formed for the tensile test. The tensile strength was a nominal stress and the maximum burden when the test piece was broken. Further according to comparison embodiment 4, a test piece of aluminum alloy base material F was formed as the same shape and was subjected to the tensile test as well.

The abrasion resistant property test was carried out on each test piece of each aluminum composite material A through E formed as a certain circular disk shape and the surface of aluminum composite portion of each aluminum composite material A through E was pressed to a certain column shape of chromium steel SCr420 (JIS G 4104) in engine oil 10W-30 for automobile. The surface pressure burden onto the aluminum composite portion was 15 MPa/min and was increased 15 MPa every minute. At the same time when the test piece of aluminum composite material A through E was pressed by the surface pressure burden, the test piece was rotated at 1 m/sec of rotation rate and when the sliding distance measured on this rotation reached to 2400 mm, volumetric reduction (mm$^3$) of each aluminum composite material was measured. The volumetric reduction was an abraded volume which was a bench mark of abrasion resistant property of each composite material. Specifically, less abraded volume (volumetric reduction) was, more excellent abrasion resistant property was. Also the abrasion resistant property of aluminum alloy base material F according to comparison embodiment 4.

Further, Vickers hardness test was carried out following JIS Z 2244. In the test, a certain quadrangular pyramid indenter was pressed to the surface of the aluminum composite portion of each aluminum composite material A through E with 98N weighting and the hardness was measured. Also the hardness of aluminum alloy base material F according to comparison embodiment 4 was measured.

Figure 8:
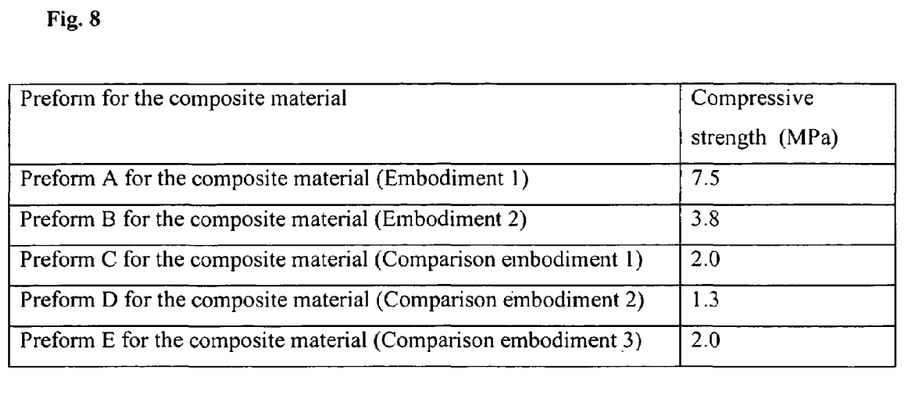
FIG. 8 is a table showing evaluation results of compressed strength of embodiments 1 and 2, and comparison embodiments 1 to 3.
Figure 9:
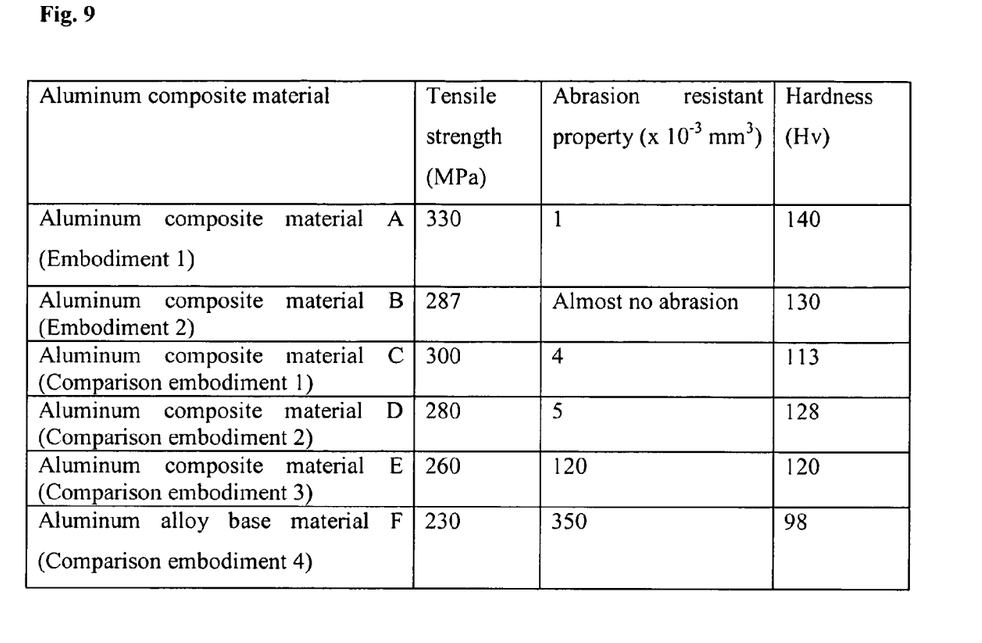
FIG. 9 is a table showing evaluation results of tensile strength, abrasion resistant property and hardness of each aluminum composite material A through E according to embodiment 1 and 2 of the invention, comparison embodiment 1 to 3, and aluminum alloy base material F of comparison embodiment 4.

The test results of preform A through E for the composite material in accordance with each test are shown in FIG. 8 and the test results of aluminum composite material A through E and aluminum alloy base material F are shown in FIG. 9.

Referring to FIG. 8, according to the compressive test results of preform A through E for the composite material, it was confirmed that the compressive strength of each preform A for the composite material according to an implementation of embodiment 1 and preform B for the composite material to an implementation of embodiment 2 of the invention was higher than of each preform C through E for the composite material. Specifically, it indicated that in preform A and B for the composite material of the embodiments, the titanium oxide was formed by the reaction of the aluminum borate whisker and the potassium titanate whisker and each reinforcement material was bound strongly and accordingly the binding force of each reinforcement material each other was stronger in comparison with preform C through E for the composite material of comparison embodiments because it was bound mainly by alumina sol (an inorganic binder). Wherein, even though in preform C for the composite material of comparison embodiment 3, the aluminum borate whisker and the potassium titanate whisker were mixed, the amount of the potassium titanate whisker added was little and it was indicated that it did not react sufficiently with the aluminum borate whisker as well as embodiments. Accordingly, preform A and B for the composite material according to an implementation of embodiment 1 and embodiment 2 of the invention had high compressive strength and also in the hot solution impregnating process which impregnates the hot solution of aluminum alloy, the aluminum composite material was able to be adequately formed without deformation and breaking accordingly. Therefore even when relatively high dense preform for the composite material is formed, it is advantageous that impregnating pressure can be increased in the hot solution impregnating process so that an occurrence of unfilled pore can be prevented.

Referring to FIG. 9, in the results of aluminum composite material A through E and aluminum alloy base material F, aluminum composite material A according to embodiment 1 of the invention performed higher strength in tensile test in comparison with aluminum composite material C through E according to comparison embodiment 1 to 3. Also, in Vickers hardness test, aluminum composite material A performed excellent hardness in comparison with aluminum composite material C through E. Wherein aluminum composite material A performed high tensile strength and hardness even in comparison with aluminum composite material C of comparison embodiment 1 in which almost the same reinforcement material was formulated. According to an implementation of embodiment 1 of the invention, it was considered because the anatase type titanium oxide formed by the reaction of the aluminum borate whisker and the potassium titanate whisker reacted with the aluminum alloy to form a hard titanium-aluminum compound.

In contrast, aluminum composite material B according to an implementation of embodiment 2 performed excellent hardness in Vickers hardness test in comparison with aluminum composite material C through E, but the tensile strength was lower in comparison with aluminum composite material C of comparison embodiment 1. It was considered because aluminum composite material B contained activated charcoal 5 which acted disadvantageously for strength. Meanwhile aluminum composite material B performed high tensile strength in comparison with aluminum composite material D and E. Therefore, even when the activated charcoal which acts disadvantageously for strength is contained, relatively high strength can be performed because as above titanium-aluminum compound is formed by the reaction of the anatase type titanium oxide and the aluminum alloy. Further aluminum composite material A and B of the embodiments of the invention performed high strength and hardness in comparison with aluminum alloy base material F and it was confirmed that an excellent property could be performed by compounding.

Further, referring to FIG. 9, in the result of abrasion resistant property test for aluminum composite material A through E and aluminum alloy base material F, it was confirmed that aluminum composite material A and B of the embodiments of the invention had excellent abrasion resistant property in comparison with aluminum composite material C through E of the comparison embodiments and especially had extremely high abrasion resistant property in comparison with aluminum composite material E and aluminum alloy base material F. Further, the abrasion resistant property of aluminum composite material A and B was increased in comparison with aluminum composite material C of comparison embodiment 1. Therefore according to the embodiments of the invention, it was confirmed that even if the potassium titanate whisker which is generally considered as disadvantageous for abrasion resistant property is added in relatively large amount, it reacts with the aluminum borate whisker to generate titanium oxide to be able to increase abrasion resistant property. In contrast, aluminum composite material B of embodiment 2 of the invention was not abraded almost under such condition and performed farther high abrasion resistant property. This is because the activated charcoal which had excellent sliding property was contained and forming of an aluminum composite material having farther excellent abrasion resistant property in comparison with a manufacturing method in which the above traditional activated charcoal (or graphite) is added as a powder with burnout property. Thus aluminum composite material B is adequate to be applied to the product or the part in which abrasion resistant property is more significant in comparison with strength.

Further, in aluminum composite material D according to comparison embodiment 2, the aluminum borate whisker was added relatively in large amount and performed excellent abrasion resistant property in comparison with aluminum alloy base material and usefulness of the aluminum borate whisker was confirmed accordingly. Further, preform E for the composite material and aluminum composite material E of comparison embodiment 3 performed low strength and low hardness in comparison with embodiment 1 and 2 of the invention and it was understandable that the potassium titanate whisker and the alumina short fiber did not react.

Figure 10A:
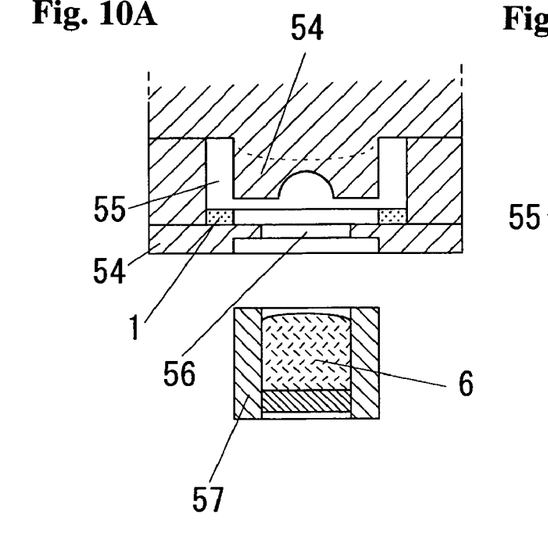
FIGS. 10A–10D are figures illustrating a cast forming process of engine piston 50 reinforced with preform A for the composite material according to embodiment 1 of the invention.
Figure 10B:
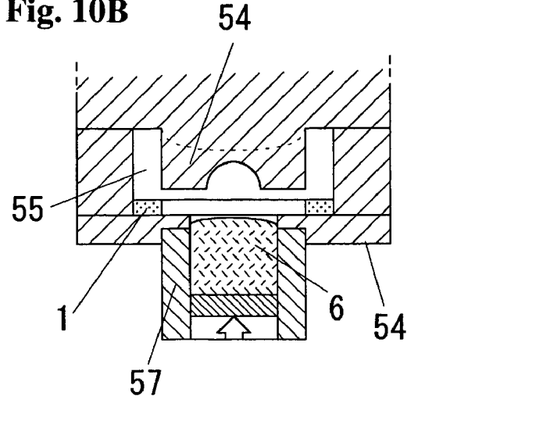
Figure 10C:
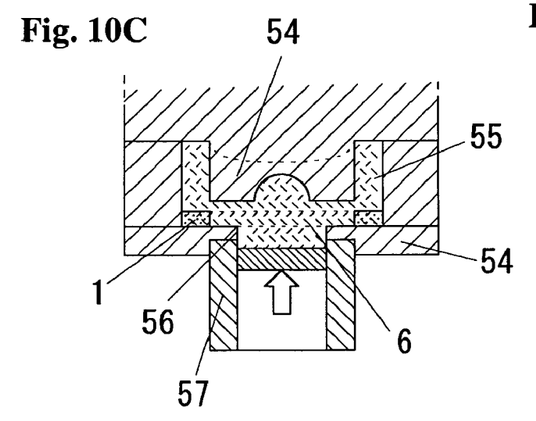
Figure 10D:
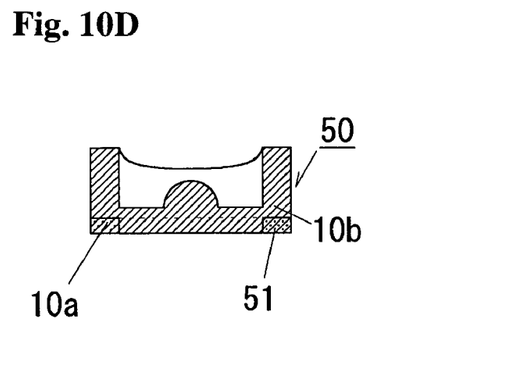

Thus embodiment 1 and embodiment 2 of the invention relate to aluminum composite material A and B which can perform high strength and hardness, and excellent abrasion resistant property and preform A and B for the composite material and accordingly can be adequately applied to an engine piston of automobile which requires severe property. For example, engine piston 50 (FIG. 10C) in which head peripheral portion 51 is reinforced by aluminum composite material A can be formed by the cast forming process (the hot solution impregnating process) referring to FIG. 10. Referring to FIG. 10(a), in the cast forming process, preform 1 for the composite material (preform A for the composite material) formed like a pipe is installed to the forming position of head peripheral portion 51 in cavity 55 formed by a certain metal mold 54 and a certain amount of the hot solution of aluminum alloy 6 was pored into sleeve 57 connected to hot solution inlet 56 of metal mold 54. Then after referring to FIG. 10(b), sleeve 57 is connected to hot solution inlet 56 of metal mold 54 and the hot solution reserved in sleeve 57 is injected into cavity 55 with a certain injection rate and injection pressure. Then, referring to FIG. 10(c), when the hot solution filled up cavity 55, the injection is stopped and it is cooled down. Then metal mold 54 is taken out and the portion formed by hot solution inlet 56 is removed. (Figure is not shown.) Accordingly, referring to FIG. 10(d), piston 50 integrally formed with head peripheral portion 51 composed of aluminum composite portion 10a reinforced with preform 1 for the composite material (preform A for the composite material) and aluminum alloy portion 10b can be obtained.

Further, according to embodiment 2, preform B for the composite material contains activated charcoal 5, but instead of activated charcoal 5 it can contain graphite to be able to form aluminum composite material 10 which can perform the same compressive strength and also the same tensile strength, abrasion resistant property and hardness.

What is claimed is:

1. A preform for a composite material comprising:
   a pre-mixture which is sintered at a predetermined temperature,
   said pre-mixture comprising at least an aluminum borate whisker and a potassium titanate whisker which homogeneously co-exist;
   wherein said potassium titanate whisker is present in a range of greater than 5% and no more than 20% by volume relative to a total volume of the pre-mixture and said aluminum borate whisker is present in a range of 10% to 20% by volume relative to the total volume;
   a titanium oxide is produced by a reaction of the aluminum borate whisker and the potassium titanate whisker, and said titanium oxide binds to the surface of the aluminum borate whisker.

2. A preform for the composite material according to claim 1;
   wherein an average fiber diameter and an average fiber length of the aluminum borate whisker are larger or longer than those of the potassium titanate whisker.

3. A preform for the composite material according to claim 2;
   wherein the average fiber diameter of the aluminum borate whisker is in a range of 0.5 μm to 5 μm, and the average fiber length of said aluminum borate whisker is in a range of 10 μm to 50 μm.

4. A preform for the composite material according to claim 2;
   wherein the average fiber diameter of said potassium titanate whisker is in a range of 0.1 μm to 1 μm, and the average fiber length of said potassium titanate whisker is in a range of 5 μm to 20 μm.

5. A preform for the composite material according to claim 1;
   wherein said pre-mixture comprising an alumina short fiber.

6. A preform for the composite material according to claim 1;
   wherein said pre-mixture comprises graphite and/or activated charcoal,
   said pre-mixture is sintered at a predetermined temperature in which said graphite and/or said activated charcoal form a binding state with said aluminum borate whisker.

7. An aluminum composite material formed by impregnating a hot solution of aluminum alloy to the preform for the composite material according to claim 1 by pressurized casting.

8. An aluminum composite material according to claim 7, comprising:
   a composite portion formed by impregnating an aluminum alloy to the preform for the composite material; and
   a metal portion comprising an aluminum alloy, said composite portion and the metal portion being integrally formed.

9. A preform for the composite material according to claim 1, wherein stable rutile and the unstable anatase types of titanium dioxide are formed by the reaction of the aluminum borate whisker and the potassium titanate whisker, and impregnation of the preform with molten aluminum results in the unstable anatase titanium dioxide reacting with the aluminum to form a hard titanium-aluminum compound.

* * * * *